(12) United States Patent
Choi et al.

(10) Patent No.: US 8,441,227 B2
(45) Date of Patent: May 14, 2013

(54) PORTABLE TERMINAL

(75) Inventors: Byung-Sung Choi, Suwon (KR);
Won-Ho Choi, Gwacheon (KR)

(73) Assignee: LG Electronics Inc., Seoul (KR)

( * ) Notice: Subject to any disclaimer, the term of this patent is extended or adjusted under 35 U.S.C. 154(b) by 405 days.

(21) Appl. No.: 12/899,996

(22) Filed: Oct. 7, 2010

(65) Prior Publication Data

US 2011/0109259 A1    May 12, 2011

(30) Foreign Application Priority Data

Nov. 6, 2009   (KR) ........................ 10-2009-0107140

(51) Int. Cl.
*H02J 7/00*      (2006.01)
*H01M 10/44*    (2006.01)
*H01M 10/46*    (2006.01)

(52) U.S. Cl.
USPC ......................................... 320/101; 320/103

(58) Field of Classification Search .................. 320/101, 320/103, DIG. 21
See application file for complete search history.

(56) References Cited

U.S. PATENT DOCUMENTS

| 6,339,311 B1 * | 1/2002 | Caldwell ...................... 320/101 |
| 2006/0114665 A1 * | 6/2006 | Patino et al. ..................... 362/88 |
| 2008/0072950 A1 | 3/2008 | Lin et al. |
| 2009/0023481 A1 | 1/2009 | Foster et al. |

FOREIGN PATENT DOCUMENTS

| CN | 2593481 | 12/2003 |
| CN | 2909714 | 6/2007 |
| GB | 2 386 027 A | 9/2003 |
| GB | 2 425 884 A | 11/2006 |

OTHER PUBLICATIONS

Chinese Office Action dated Aug. 20, 2012 for related Chinese Application No. 201010508387.3.
European Search Report dated Mar. 7, 2011.

* cited by examiner

*Primary Examiner* — Samuel Berhanu
(74) *Attorney, Agent, or Firm* — Ked & Associates LLP

(57) ABSTRACT

A portable terminal includes a cover movably coupled to a body, a first solar cell on the body; and a second solar cell on the cover. The first and second solar cells may be oriented in the same or different directions. When oriented in the same direction, both solar cells may receive light when the cover is opened relative to the body. The solar cells output voltages for simultaneously charging a battery when the cover is opened and when voltages from the first and second solar cells exceed a predetermined reference voltage.

19 Claims, 11 Drawing Sheets

PORTABLE TERMINAL

CROSS-REFERENCE TO RELATED APPLICATIONS

Pursuant to 35 U.S.C. §119(a), this application claims priority to Korean Application No. 10-2009-0107140, filed on Nov. 6, 2009, the contents of which is incorporated herein by reference.

BACKGROUND

1. Field

One or more embodiments described herein relate to portable terminals.

2. Background

Portable terminals have been designed to perform a variety of functions, not the least of which includes capturing still or moving images, playing music and video files or games, and receiving multimedia content for playback on an integrated player. Newer terminals now even allow users to express their own personalities through the use of avatars or other custom functions. Unfortunately, these terminals consume a lot of power, which limits their use.

DETAILED DESCRIPTION

Figure 1:
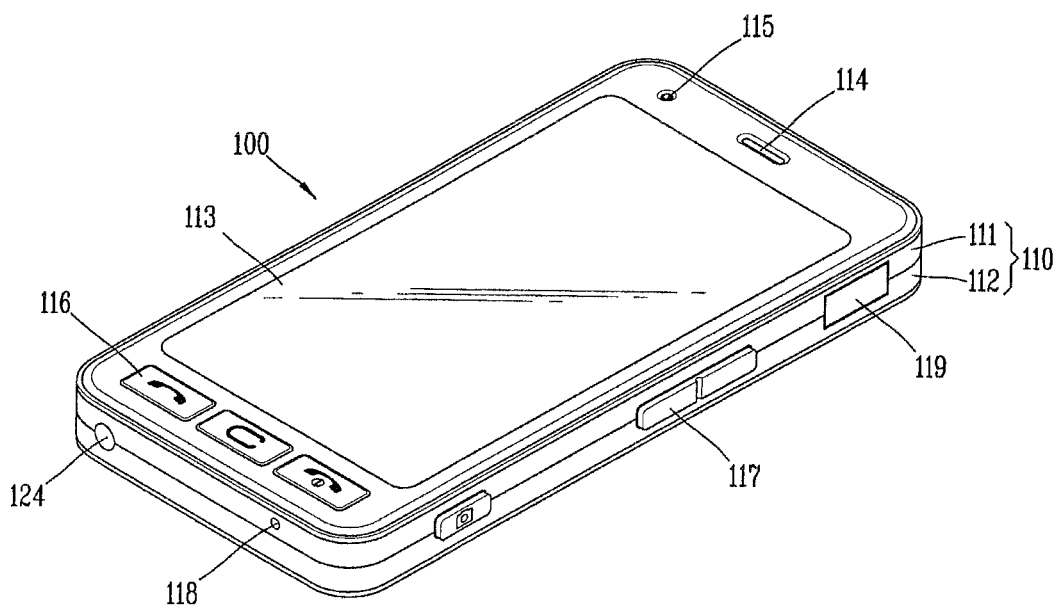
FIG. 1 is a diagram showing one embodiment of a portable terminal.

FIG. 1 shows one embodiment of a portable terminal 100, which includes a terminal body 110 formed from a front case 111 and a rear case 112. Various electronic components may be integrated in a space formed between the front and rear cases, and at least one middle case may be disposed between the front and the rear cases. The cases may, for example, be formed by injection-molding a synthetic resin or may be also formed of a metal material such as stainless steel (STS) or titanium (Ti) or another metal or alloy.

The terminal body may include a display unit 113, a first audio output unit 114, a first image input unit 115, a first and a second manipulation units 116, 117, an audio input unit 118, and an interface 119 as well as other features.

The display unit may include a liquid crystal display (LCD) module, an organic light emitting diode (OLED), and/or other displays or indicators for visually representing information. In addition, the display unit may include one or more input devices, e.g., a touch screen. Using the input device(s), visual information such as numerals, characters, symbols, and the like, may be entered and displayed on the display unit. The visual information may be indicative of a phone number or terminal address as well as other information. When a touch screen is used, a user can input information by touching visual information displayed on the display unit.

The first audio output unit 114 may include a receiver and/or speaker, and may be disposed at an end of the terminal body so that it can be positioned at a user's ear.

The first image input unit 115 include a camera module for capturing images or video.

The first and second manipulation units 116, 117 may receive a command for controlling corresponding operations of the portable terminal. The first and the second manipulation units may be designed in any one of a variety of ways. For example, the manipulation units may be implemented as a dome switch or touch pad designed to receive a command or information based on a user's push or touch, and/or may be implemented with a wheel or jog device that allows a key to be rotated. Any number of buttons or a joystick may alternatively or additionally be used.

From a functional standpoint, first manipulation unit 116 may be configured to input a command such as START, END, SCROLL or the like, and second manipulation unit 117 may be configured to perform functions that include controlling the volume of audio output from the first audio output unit and activating and/or deactivating a touch recognition mode of the display unit, as well as other functions.

The sound input unit 118 may be implemented, for example, as a microphone to receive the user's voice or other sounds.

The interface 119 may provide an interface connection to an external device, in order to allow data to be exchanged between the device and terminal. For example, the interface provide a connection terminal to wired or wireless earphones, a port for short-range communications (e.g., IrDA port, Bluetooth port, wireless LAN port, and the like), and/or a power supply terminal. Additionally, or alternatively, the interface may be formed as a card socket for accommodating an external card such as Subscriber Identification Module (SIM), User Identity Module (UIM), memory card for storing various formed of data and information.

Figure 2:
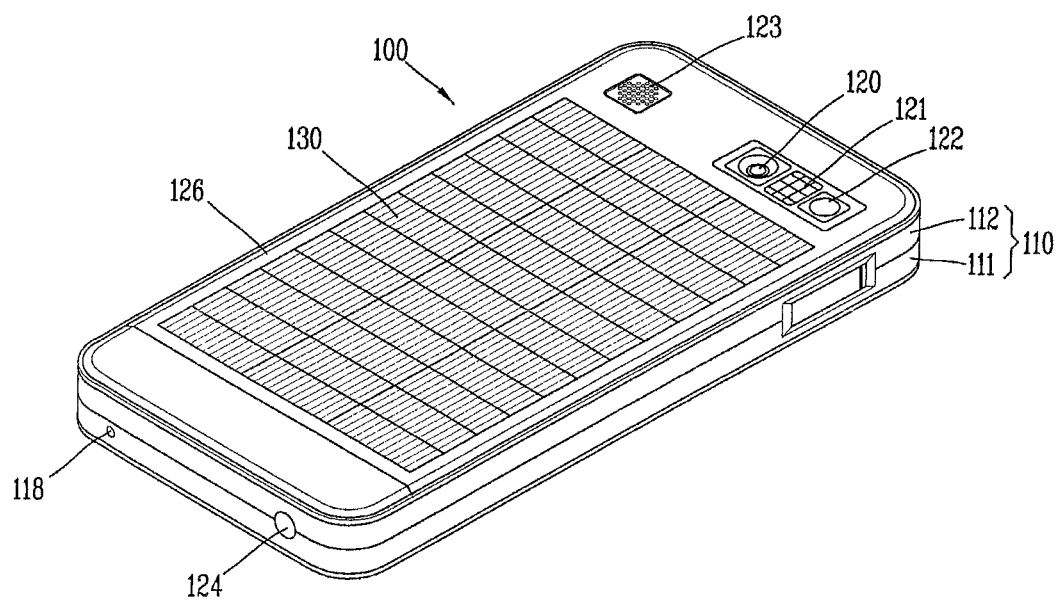
FIG. 2 is a diagram showing a rear side of the embodiment of FIG. 1.

FIG. 2 shows a rear side of the terminal, which in accordance with one embodiment includes a second image input unit 120. The second image input unit may point in a direction which is substantially opposite to a direction in which the first image input unit 115 (see FIG. 1) points. Also, the second image input unit may be a camera having a different pixel resolution from a camera of the first image input unit.

According to one embodiment, first image input unit 115 may have a relatively small pixel resolution, e.g., a resolution sufficient to allow the image of a captured face of the user to be clearly recognizable by another party, who receives the image during a video call or the like. On the other hand, second image input unit 120 may have a relatively large pixel resolution which will allow capture of images that are to be stored or which are not intended to be transmitted immediately.

Furthermore, a flash 121 and mirror 122 may be disposed adjacent the second image input unit. The flash projects light towards an object whose image is to be captured by the second image input unit, and the mirror may allow the user to look at his or her own face, or the like, in a reflected way when capturing himself or herself, for example, in a self-portrait mode, using the second image input unit.

In addition to the aforementioned features, an second audio output unit 123 may be disposed on a rear surface of the terminal body. The second audio output unit can output stereo sound when used together with audio output unit 114 (FIG. 1), and/or may be used to implement a speaker phone mode during a phone call.

Figure 3:
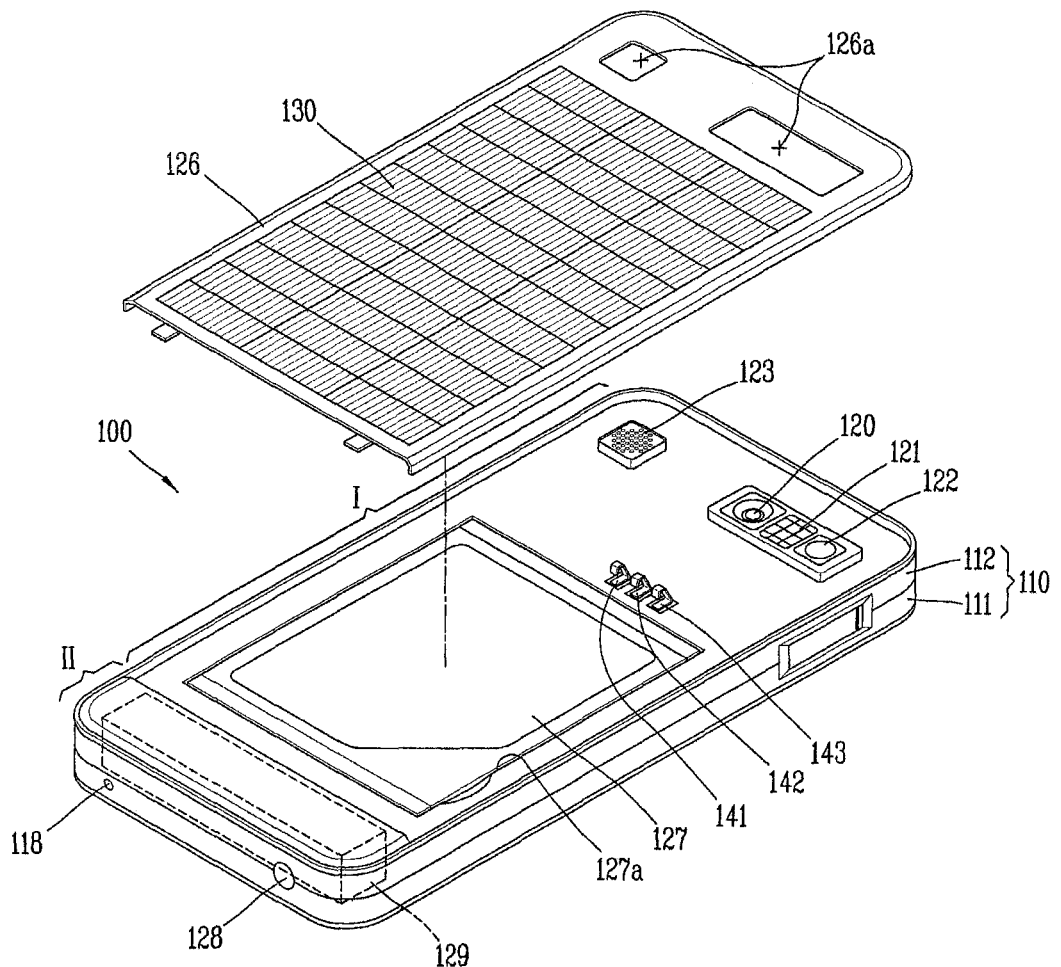
FIG. 3 is a diagram showing an interview view of the portable terminal of FIGS. 1 and 2.

A power supply unit 125 (FIG. 8), mounted, for example, in rear case 112, may supply power to the portable terminal. In this embodiment, the power supply unit may include a rechargeable battery 125 and a battery cover 126 which covers the battery may be detachably mounted on the rear case. As shown in FIG. 3, through holes 126*a* may be formed on the battery cover to allow the second image input unit and second audio output unit to be externally exposed.

A broadcast signal receiving antenna 124 may be disposed at one side of the terminal body, in addition to an antenna to be used in supporting phone calls. Antenna 124 may be a type which is capable of being pulled out of the terminal body.

The portable terminal may also include a solar cell 130 for converting solar energy into electrical energy. The solar cell may include a semiconductor element for converting solar energy into electrical energy using, for example, a photovoltaic effect. The solar cell may be implemented, for example, as a silicon solar cell or a compound semiconductor solar cell.

The solar cell may be mounted on an outer surface of the battery cover 126. Alternatively, the solar cell may be attached to other forms of covers detachably mounted on the terminal body as well as the battery cover.

Figure 4:
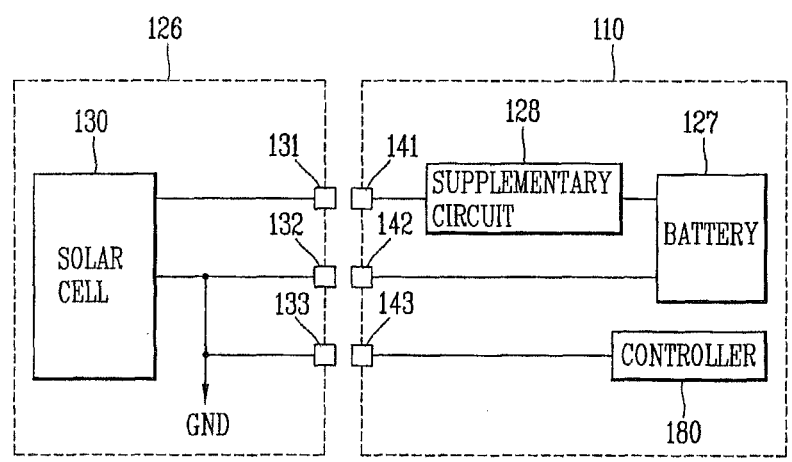
FIG. 4 is a block diagram showing one possible configuration a solar cell coupled to a battery used to power the portable terminal.

FIG. 3 shows another view of the portable terminal, where the battery cover has been removed to reveal an internal configuration of the terminal body. And, FIG. 4 shows a block diagram showing one possible way in which the solar cell may be coupled to the battery of the terminal.

As shown in FIG. 3, a battery mounting portion 127*a* for mounting the battery 127 is formed at the rear surface of the terminal body. The battery is electrically coupled to a printed circuit board within the terminal body and operates to supply power to the printed circuit board for operating the portable terminal. As shown, the battery is electrically coupled to solar cell 130 on the battery cover. As mentioned, the solar cell operates to convert solar energy into electrical energy for charging the battery.

As shown in FIG. 3, the terminal body may also include a first region (I) and a second region (II). The first region may include the solar cell covered by battery cover 126, and the second region (II) may include an antenna 129 for transmitting and receiving radio signals. In accordance with one embodiment, the first and second regions are formed at non-overlapping locations, with the second region formed at a lower portion of the first region. That is, the first region may be located separately from the second region to thereby prevent (reduce or minimize the chances of) the solar cell from interfering with performance of the antenna, i.e., in order to reduce radio sensitivity.

The battery may be connected to the solar cell by one or more terminals. In accordance with one embodiment, first through third cover terminals 131 to 133 may be provided on a rear surface of battery cover 126 and first through third connection terminals 141 to 143 may provided on a rear surface of terminal body 110. The connection terminals 141 to 143 are brought into contact with respective ones of the cover terminals 131 to 133 when the battery cover is mounted on the terminal body.

Connection terminals 131 and 132 may be electrically coupled with battery 127 to charge the battery, and connection terminals 141 and 142 may be referred to as "power supply terminals" because they supply power to the battery.

The first and the second connection terminals 141, 142 may be implemented in the form of positive and negative polarities respectively. In one embodiment, the first connection terminal 141 may have a positive polarity and the second connection terminal 142 may have a negative polarity. The second cover terminal 132, which is in contact with the second connection terminal 142, may be connected to ground (GND) formed at battery cover 126. A supplementary circuit 128 for performing a voltage control operation may be coupled to the first connection terminal 141 or second connection terminal 142.

The third connection terminal 143 may be disposed at one side of the first connection terminal 141 or second connection terminal 142. The third connection terminal 143 is provided to detect whether or not the battery cover 126 is attached thereto and therefore may be referred to as a "detect terminal." The detect terminal 143 is coupled to a controller 180, which may apply a battery charge command to a charge unit based on information detected from the detect terminal. The controller may also control display unit 113 to visually display whether or not the battery cover 126 and/or the solar cell 130 is mounted on the terminal.

The third cover terminal 133 in contact with the detect terminal 143 may be electrically coupled to a ground (GND) of the battery cover. According to this configuration, when the battery cover 126 is separated from terminal body 110, a first signal (for example, a low signal) is applied to the controller.

When the battery cover is mounted on the terminal body, detect terminal 143 is brought into contact with third cover terminal 133 and the battery cover is electrically connected to the ground (GND). Accordingly, a second signal (for example, a high signal) is applied to the controller. Based on these signals, the controller can detect whether or not the battery cover and/or solar cell is mounted on the terminal body 110.

Alternatively, a high signal may be applied to controller 180 when the battery cover 126 is separated from the terminal body and a low signal may be applied to the controller when the battery cover is mounted to the terminal body.

Accordingly, the controller can accurately detect whether or not the battery cover is mounted on the terminal body, and therefore the controller may perform one or more functions in a more accurate manner when, for example, controlling battery charge or other electronic components. For example, more precise control may be allowed in controlling a user interface related to the battery charge using solar cell 130, as will be described in greater detail below. When the controller detects mounting of the battery cover, the display unit 113 may be controlled to display operation of solar cell 130.

Figure 5A:
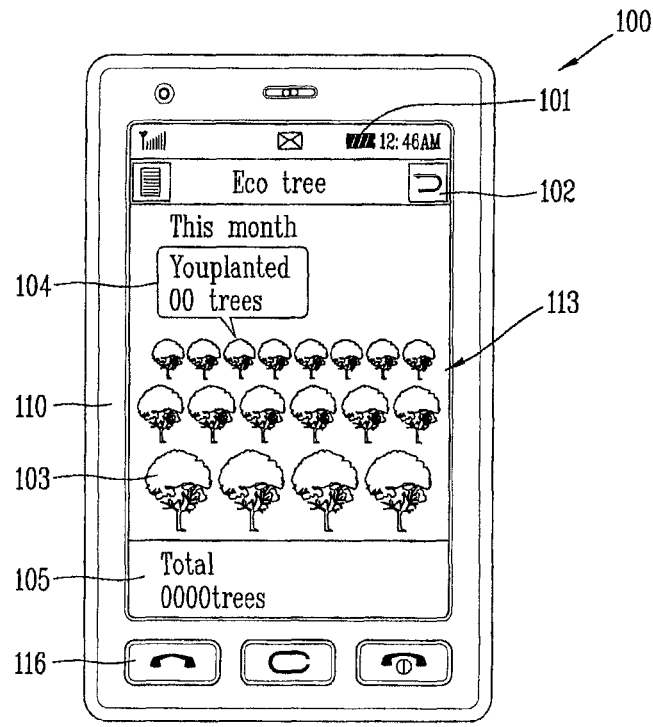
FIGS. 5A and 5B are diagrams showing one or more operational states of the portable terminal according to one or more embodiments.
Figure 5B:
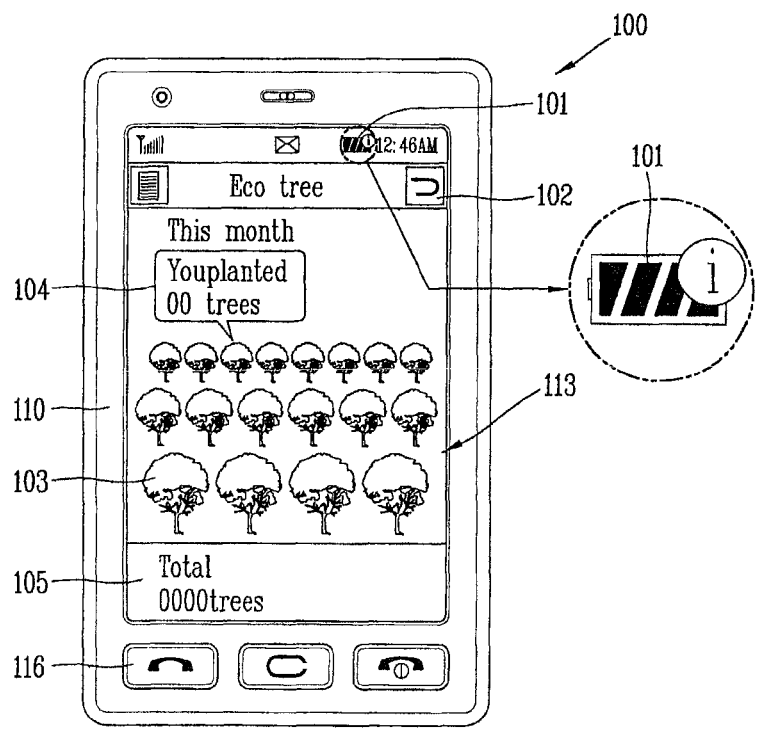

FIGS. 5A and 5B show various operational state diagrams that may correspond to one or more embodiments of the portable terminal. In particular, FIG. 5A shows a first output screen which is displayed in a state where the battery cover is separated from the terminal body, and FIG. 5B shows a second output screen which is displayed in a state where the battery cover is mounted on the terminal body.

As shown in these figures, the display unit may display an indicator 101 indicating an amount of remaining charge of the battery. For example, the indicator may be shown as the outline of a battery filled by an amount proportional to the remaining charge amount of the battery.

The display unit may change an appearance of the indicator based on whether or not the battery cover is mounted on the terminal body. For example, indicator 101 may shown as in FIG. 5A when the battery cover 126 is separated from the terminal body, thereby signifying that the battery is not currently being charged by the solar cell. Alternatively, the indicator may be shown as in FIG. 5B when the battery cover is mounted to the terminal body, to signify that the battery is connected to be charged by the solar cell.

Various types of graphical information may be also displayed to signify a battery charging state by the solar cell. For example, graphics or images 103 to 105 may be displayed to provide a visual indication of an amount by which the battery has been charged by the solar cell. This information may, for example, be displayed to indicate the amount of battery charging that has taken place over a predetermined period of time.

According to one example, tree-shaped graphics 103 may be displayed, where the number of displayed trees is proportional to the charged amount. Additionally, or alternatively, a graphic 104 may be displayed to show the charged amount that has taken place over a certain time, e.g., during the past month. Additionally, or alternatively, a graphic 105 may be displayed to show the total charged amount by the solar cell 130 over, for example, the life of the terminal or since the solar cell has been in use.

In addition, the display unit may display, for example, one or more soft keys 102 to allow a user to display a particular menu or move to a particular menu or menu item. The user inputs a relevant command by touching the soft keys.

According to such a user interface, the user can view an amount by which the battery has been charged by the solar cell, and thus the user interface may provide a function of transmitting information, as well as an advantage that the user can satisfy his interest to know the amount by which the battery has been charged by the solar cell.

Figure 6:
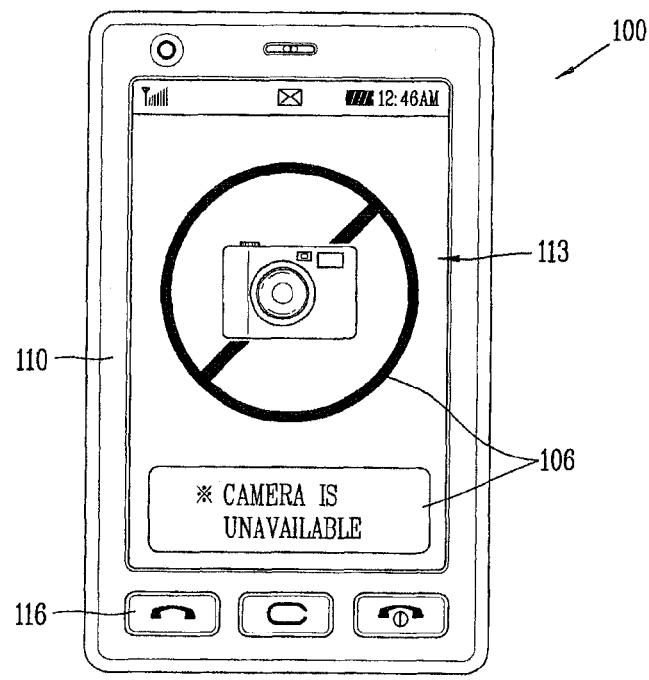
FIG. 6 is a diagram showing another operational state of the portable terminal according to one embodiment.

FIG. 6 shows an operational state according to another embodiment of the portable terminal. In the foregoing embodiment, through holes 126a are formed on the battery cover to allow a configuration (hereinafter, input/output units) related to the input/output of a portable terminal, such as the second image input unit 120, the second audio output unit 123, and the like, to be externally exposed to the outside even when the battery cover 126 is mounted on the terminal body 110.

Alternatively, the battery cover 126 may have a form of completely covering the input/output units. Accordingly, a mounting space of the solar cell 130 may be larger compared to the foregoing embodiment, and also has an advantage capable of mounting a solar cell 130 with a larger area.

In this embodiment, the terminal body may be adapted to connect to a main cover which does not include a solar cell and which covers the input/output units. This main cover may then be replaced with a battery cover that includes or has a solar cell 130 mounted thereto. The latter type of cover may therefore be considered as an auxiliary cover. In accordance with one embodiment, through holes for exposing the input/output units may be formed on the main cover, and the user can mount the main cover on the terminal body at normal times to use the portable terminal. When the user wants to charge a battery using the solar cell 130, the main cover can then be replaced with the auxiliary cover in order to charge the battery using the solar cell.

When the auxiliary cover is mounted on the terminal body 110 to cover the input/output units, the functions of the input/output unit may be restricted. For example, in case of the second image input unit 120, an image of an object may not be able to be captured because of blocking by the auxiliary cover.

When operation of one or more of the input/output units is restricted in this manner, controller 180 may detect whether or not the battery cover is mounted thereon and accordingly restrict operation of corresponding ones of the input/output unit. Moreover, the controller may allow the display unit to display a notification image (e.g., image 106 or other type of notification screen) to notify a user of the restriction to operation of the input/output unit.

For example, when the user inputs a command for operation of the second image input unit 120, in a state where the auxiliary cover is mounted on the terminal body, the notification image 106 for notifying restriction of the operation of second image input unit 120 may be displayed on display unit 113. Moreover, it may be possible to display a message which instructs the user to separate the auxiliary cover from the terminal body or to replace it with the main cover, in order to allow for proper operation of the second image input unit or other impaired input/output device.

Figure 7:
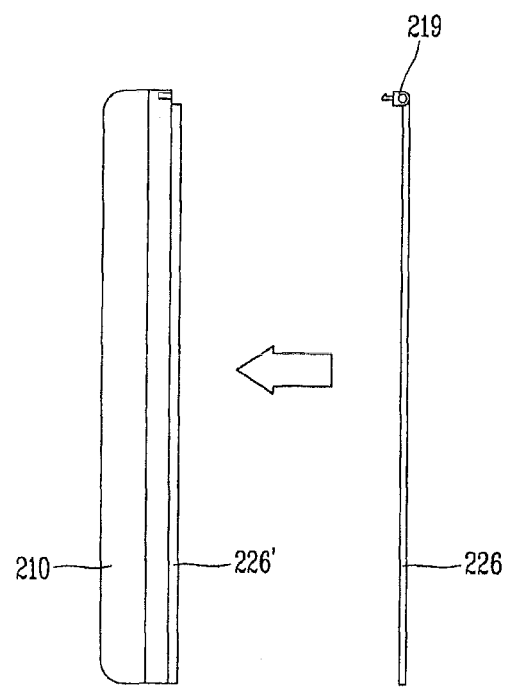
FIGS. 7 through 9 are diagrams showing different views of the portable terminal according to one embodiment.
Figure 8:
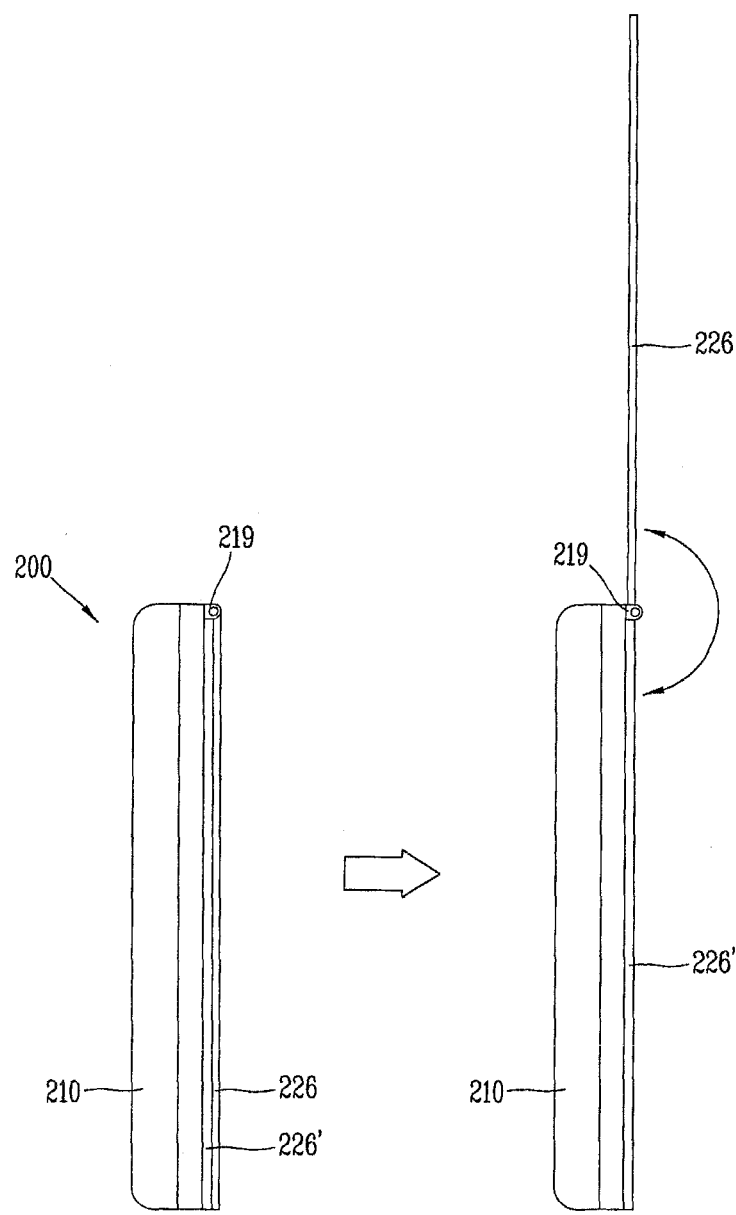
Figure 9:
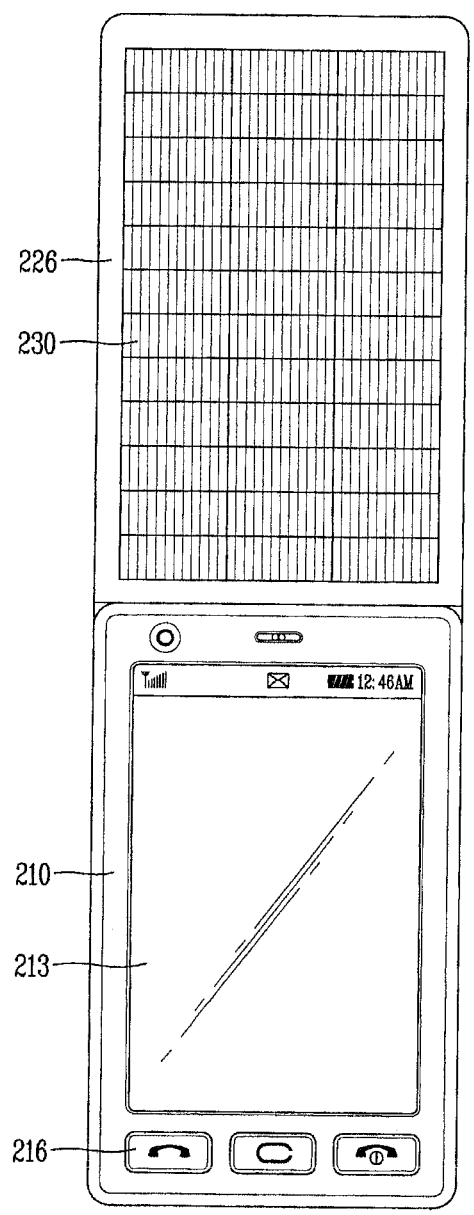

FIGS. 7 through 9 shows another embodiment of a portable terminal 200, which includes a cover 226 that is rotatably mounted on a terminal body 210. The terminal body may have a configuration similar to the foregoing embodiment, and a battery cover 226' which does not include a solar cell may be detachably mounted at a rear surface of the terminal body.

FIG. 7 shows a state in which cover 226 is separated from terminal body 210, FIG. 8 shows a process by which the cover rotates with respect to the terminal body in a state where cover 226 is mounted on the terminal body, and FIG. 9 shows a solar cell 230 mounted on an outer surface of cover 226.

As shown in these figures, a connection member 219 is provided at an end of cover 226 and may be provided to allow cover 226 to rotate. The connection member may be configured to physically and electrically connect the terminal body 210 with the cover 226, and the connection member 219 may be detachably combined with the terminal body 210. However, it may be also possible to have a configuration in which the connection member 219 is fixed to the terminal body 210.

As described in the foregoing embodiment, a configuration for detecting the mounting of a solar cell may also apply to this embodiment in a similar manner.

In the embodiment shown in FIGS. 7 through 9, the cover 226 may be connected to the terminal body 210 to cover a rear surface of the terminal body 210, and the cover may be connected to an upper or lower region of the terminal body. Also, the cover may be connected to move between a first state in which a side of the terminal body 210 is covered (refer to the left drawing of FIG. 8) and a second state in which it is rotated by a predetermined angle from the first state (refer to right drawing of FIG. 8).

By way of comparison to portable terminal 100 in FIGS. 1 and 2, sufficient light may not be able to reach solar cell 130 when terminal body 110 is placed on the floor in such a way that display unit 113 faces upward. Accordingly, the portable terminal should be placed in such a way that display unit 113 faces downward in order that sufficient light reaches to the solar cell 130. Therefore, it may be difficult to charge the battery using the solar cell while at the same time viewing the display unit.

However, in this embodiment, portable terminal 200 may solve this problem. When cover 226 is in the first state, solar cell 230 is oriented to a rear side of the portable terminal. In other words, display unit 213 and solar cell 230 are oriented in opposite directions relative to each other.

FIG. 9 shows a front view of portable terminal 200 when cover 226 is in the second state. When cover 226 is in the second state, solar cell 230 is oriented to a front side of the portable terminal. In other words, in the second state, the display unit 213 and the solar cell 230 have the same orientation direction. Accordingly, it may be possible to charge the terminal battery using the solar cell while at the same time conveniently viewing the display unit, even when a rear surface of the terminal body is placed on contact with the floor.

Figure 10:
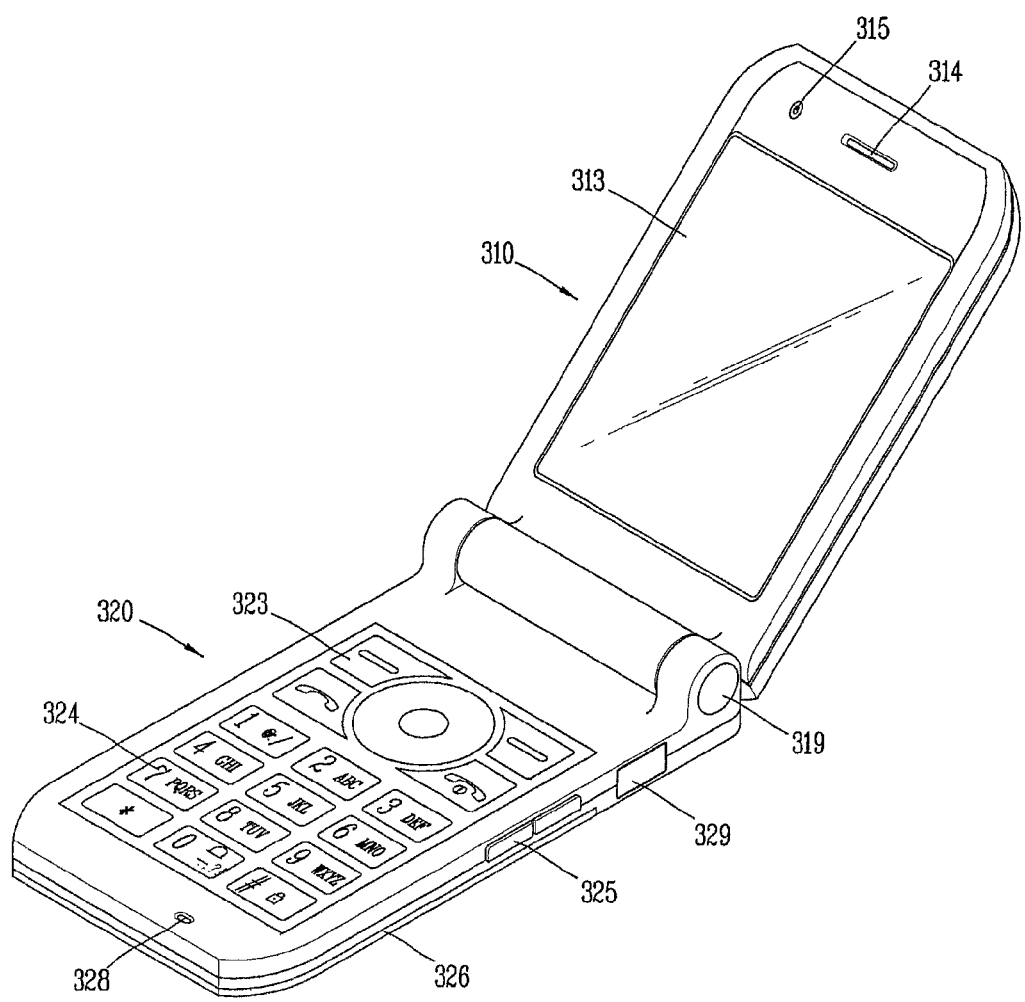
FIGS. 10 and 11 are diagrams showing front and rear views according to another embodiment of a portable terminal.
Figure 11:
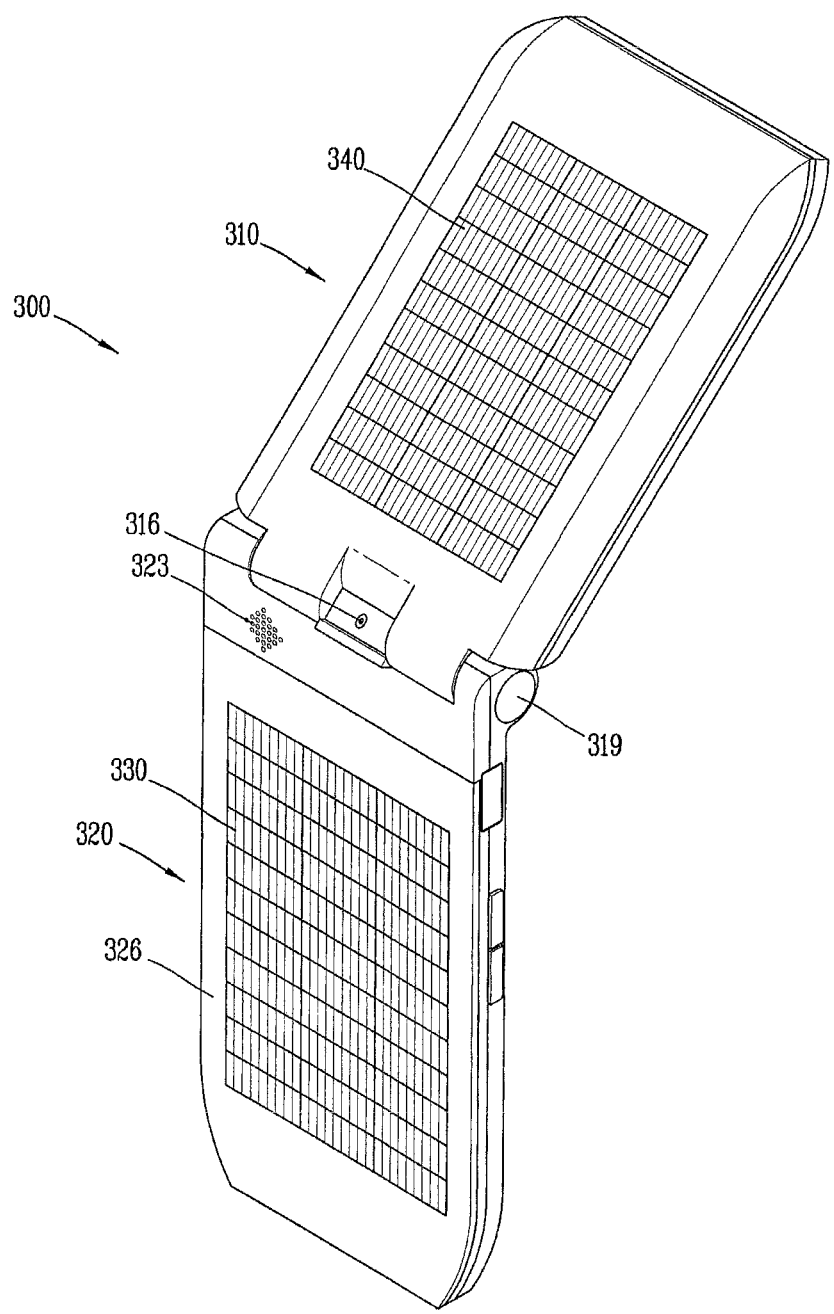

FIGS. 10 and 11 show another embodiment of a portable terminal 300, which includes a first body 310 (folder) and a second body 320 (terminal body, main body, etc.) that are foldably combined with each other. In other embodiments, the portable terminal may be, for example, any one of a slide-type, swivel-type, or swing-type terminal.

According to the embodiment of FIGS. 10 and 11, first body 310 and second body 320 are rotatably connected to each other through a hinge connection portion 319. The hinge connection portion 319 may include a cam device for providing an elastic force during a process of rotating the first body and a connection member for electrically connecting the first body with the second body.

A state in which the first body is disposed to be overlapped with the second body may be referred to as a folding configuration, and a state in which at least part of the second body is exposed or separated from the first body may be referred to as an unfolding configuration.

The portable terminal is primarily operated in a standby mode in a closed configuration, but the standby mode may be released by manipulation of the terminal by a user. Furthermore, the portable terminal is primarily operated in a phone call mode, or the like in an open configuration, but it may be switched into the standby mode by manipulation of the user or upon the passage of a predetermined time period.

The first body 310 may be disposed with a display unit 313, a first image input unit 314, a first audio output unit 315, a second image input unit 316, and the like. Furthermore, the second body 320 may be disposed with a first through a third manipulation units 323, 324, 325, an audio input unit 328, an interface 329, and the like.

As shown in FIG. 11, the portable terminal may also include first and second solar cells 330 and 340 which mounted at different locations. For example, the first solar cell 330 may be mounted on an outer surface of second body 320 and the second solar cell 340 may be mounted on an outer surface of first body 310.

Here, the first solar cell is mounted on a detachable battery cover 326 in a manner similar to one or more of the foregoing embodiments. The portable terminal may also detect whether or not the battery cover (having the first solar cell) is mounted on the second body 320 in a manner similar to the foregoing embodiments.

In this embodiment, the first and the second solar cells 330 and 340 will be externally exposed in both folding and unfolding configurations. However, the amount of light which reaches the first solar cell and second solar cell may be different based on the placed configuration or posture of the portable terminal and/or the position of a light source, and the like.

For example, in case where either one of the first and the second solar cells 330, 340 faces upward, the other one faces downward when the portable terminal 300 in a folding configuration is placed on the floor. As a result, only one of the first and the second solar cells will generate electrical energy to charge the battery. In this case, the other one not being used to charge the battery may be blocked to prevent the leakage of charging current.

Figure 12:
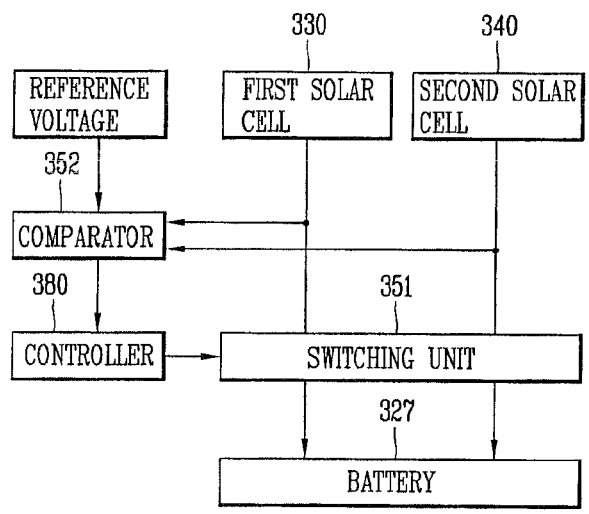
FIG. 12 is a diagram showing one way in which a battery of a portable terminal may be charged in accordance with one or more embodiments.

FIG. 12 shows one type of method that may be used to block one of the first or second solar cells from charging or otherwise from being coupled to battery 327. As shown, the first and the second solar cells are connected with battery 327 by power supply lines. A switching unit 351 for opening or closing the power supply lines is provided between the first and the second solar cells and the battery. The switching unit is configured to open or close the power supply lines connected to the first and the second solar cells respectively.

Moreover, the first and the second solar cells are electrically connected to a comparator 352. The comparator is configured to compare a voltage value of the electrical energy generated by each of the first and the second solar cells with a preset reference voltage 353. The reference voltage may, for example, be set to a minimum voltage value required to charge the battery.

Controller 380 is connected to the comparator and switching unit 351 to control the switching unit based on the comparison result of the comparator. When a voltage value generated from at least one of the first or second solar cells is higher than the reference voltage, the controller controls the switching unit to connect the corresponding power supply line(s) to the battery.

For example, when a voltage generated from first solar cell 330 is higher than the reference voltage and a voltage generated from second solar cell 340 is lower than the reference voltage, the switching unit will connect the power supply line connected to the first solar cell to the battery and will disconnect the power supply line connected to the second solar cell 340. As a result, only electrical energy generated from the first solar cell will be supplied to the battery. Shutting off the connection to the second solar cell will prevent leakage.

If both the first and second solar cells are detected to generate a voltage higher than the reference voltage value, then the switching unit allows both power supply lines to be connected to the battery. As a result, electrical energy generated from both the first and the second solar cells will be supplied to the battery 327.

This embodiment, therefore, has an advantage of detecting which one of the first and the second solar cells is operational. Accordingly, a light sensor for measuring the amount of light reaching the first and the second solar cells, or an acceleration sensor for detecting the posture of a portable terminal, does not need to be mounted on the portable terminal, thereby lowering the cost of the terminal and its complexity.

Figure 13:
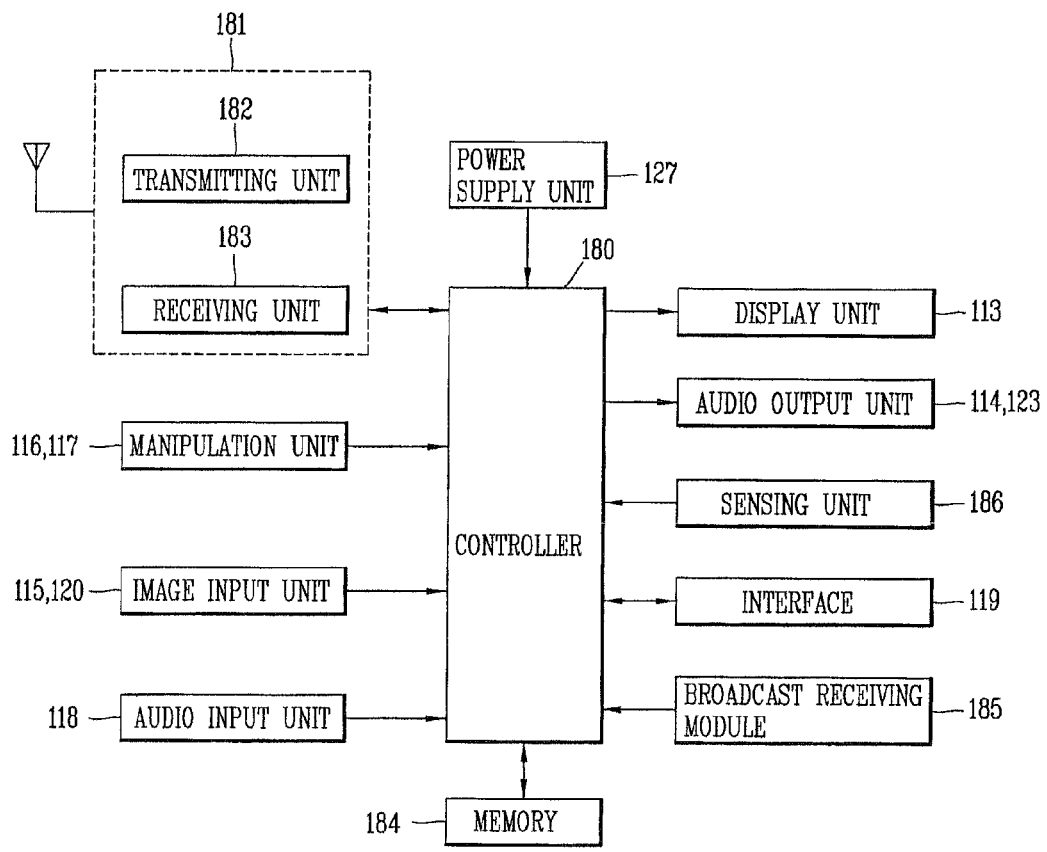
FIG. 13 is a diagram showing an internal configuration of a portable terminal in accordance with one or more embodiments.

FIG. 13 shows an example of an internal configuration of a portable terminal in accordance with one or more of the aforementioned embodiments. This configuration will be described based on the configuration of portable terminal 100 as illustrated in FIGS. 1 and 2. However, this configuration may also be implemented in either or both of portable terminals 200 and 300.

As shown in FIG. 13, the portable terminal may include a wireless communication module 181, manipulation units 116 and 117, image input units 115 and 120, an audio input unit 118, a display unit 113, audio output units 114 and 123, a sensing unit 186, an interface 119, a broadcast receiving module 185, a memory 184, a power supply unit 125, and a controller 180.

The controller 180 may control the general operations of the terminal including, for example, control and processing for voice calls, data communications, video calls, and the like.

The controller 180 may also control display unit 113 to display various forms of information, and/or may control audio output units 114 and 123 to output one or ore particular predetermined sounds based on whether or not solar cell 130 detected by the detect terminal 143, thereby indicating that the solar cell is connected for charging the battery. In addition, the controller may control the display unit and the audio output units to output information relating to functions that are restricted during charging by the solar cell.

The wireless communication module 181 transmits and/or receives a radio signal to and/or from a mobile communication base station via an antenna. For example, the wireless communication module includes a transmission unit 182 taking charge of the transmission/reception of voice data, character data, image data and control data under the control of controller 180 and modulating a signal to be transmitted and transmitting the modulated signal and a receiving unit 183 demodulating a received signal.

The manipulation units 116 and 117 may provide key input data input by a user to controller 180 to control operation of a portable terminal.

The image input units 115 and 120 may process image frames such as still or moving images acquired by an image sensor in a video call mode or an image capture mode. The processed image frames may be converted into image data that can be displayed on the display unit. The image frames processed by the image input units may be stored in memory 184 and/or transmitted to an external device via wireless communication module 181 under the control of the controller.

The audio input unit 118 may receive external audio signals via a microphone in a phone call mode, recording mode, voice recognition mode, or the like, and process the received audio signals into electrical voice data. In the phone call mode, the processed voice data is converted into a form that can be transmitted to a mobile communication base station via the wireless communication module 181, and then transmitted to the wireless communication module. In the recording mode, the processed voice data is outputted to be stored in memory 184. The audio input unit 118 may also perform various types of noise canceling (or suppression) algorithms to cancel (or suppress) noise generated during the process of receiving and transmitting audio signals.

The display unit 113 may output information processed in the portable terminal. For example, when the portable terminal is in the phone call mode, the display unit may display a User Interface (UI) or a Graphic User Interface (GUI) associated with a call or other communication under control of the controller. When the portable terminal is in the video call mode or image capture mode, the display unit may display a captured image, UI, or GUI under the control of the controller.

The audio output units 114 and 123 may convert audio data received from wireless communication module 181 or stored in memory 174 and output the converted data in a call signal reception mode, phone call mode, recording mode, voice recognition mode, broadcast reception mode, and the like, under control of the controller. Furthermore, the audio output units may provide audio signals related to a particular function (e.g., call signal reception sound, message reception sound, etc.) performed by the portable terminal. The audio output units may also include a speaker, a receiver, a buzzer, and the like.

The sensing unit 186 detects a current status of the portable terminal such as an open or closed configuration, a location of the portable terminal, presence or absence of the user's contact, or the like, and generates a sensing signal for controlling the operation of the portable terminal. For example, the sensing unit may perform a sensing function related to whether or not power is supplied by the power supply unit 125 or whether or not the interface 119 is coupled with an external device.

The interface 119 may serve as an interface with at least one external device connected with the portable terminal. For example, the external devices may include a wired/wireless headset, an external power charger, a wired/wireless data port, a card socket (e.g., memory card, SIM/UIM card, etc.), and the like. The interface may be used to receive data or power from an external device and deliver it to each element within the portable terminal, or may be used to transmit data within the portable terminal to an external device.

The memory 184 may store a program for processing and controlling the controller, or may temporarily store data being inputted/outputted (e.g., a phonebook, messages, still images, video, etc.). The memory may also store a program that controls the operation of the portable terminal. The memory may be implemented as one or more of a hard disk, card-type memory (e.g., SD or XD memory, etc.), flash memory, Random Access Memory (RAM), Read-Only Memory (ROM), and the like.

The broadcast receiving module 185 may receive a broadcast signal transmitted through a satellite or terrestrial means, convert the same into a broadcast data format that can be outputted to the audio output units, display unit, and output the converted data to the controller. In addition, the broadcast receiving module may receive supplementary data (e.g., Electronic Program Guide (EPG), channel list, etc.) associated to a broadcast. The broadcast data and supplementary data converted by the broadcast receiving module 175 may be stored in the memory 184.

The power supply unit 127 is provided with internal or external power to supply power required for operation of each element under control of the controller.

Figure 14:
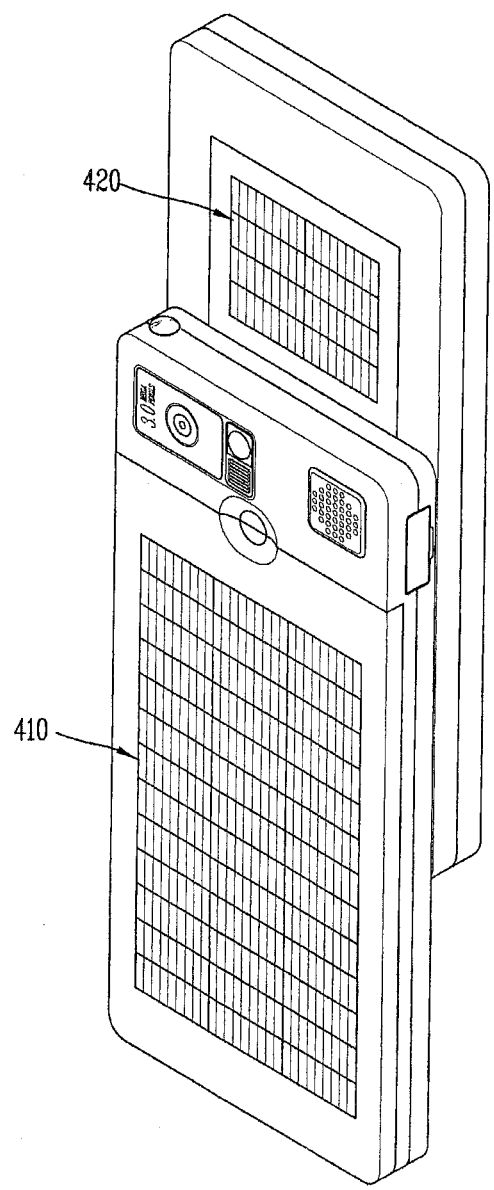
FIG. 14 is a diagram showing a rear view of a slide-type portable terminal according to another embodiment.

FIG. 14 shows a slide-type portable terminal which includes two solar cells. The first solar cell 410 is located on a rear surface of a main body of the portable terminal and the second solar cell 420 is located on a rear surface of a portion of the terminal that slides relative to the main body. The opposing side the sliding portion may include, for example, a keypad. As in other embodiments described herein, a separate indicator may be provided for each solar cell (e.g., as in FIGS. 5A and 5B) indicating whether the solar cell is active, a battery charging state in relation to each of the solar cells, including display of graphics (e.g., trees) as well as other features mentioned above.

Figure 15:
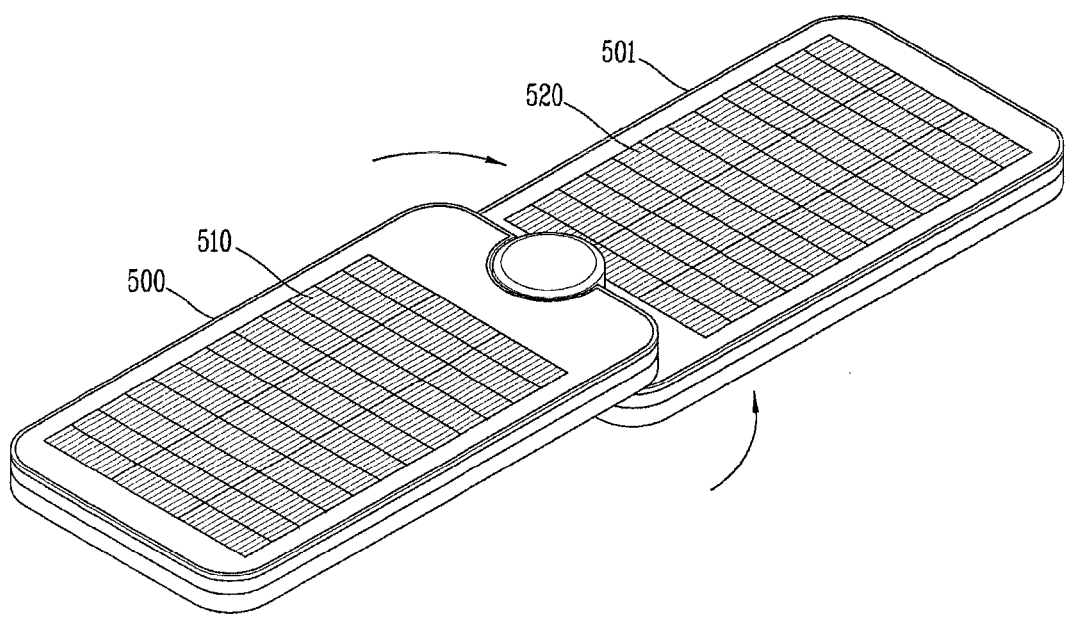
FIG. 15 is a diagram of a rear view of a rotatable-type portable terminal.

FIG. 15 shows a rotatable-type portable terminal where a cover rotates relative to a body 500. The body and cover relatively include solar cells 510 and 520 and may operate in a manner similar to the other embodiments, including the display of activation and charging state information as previously described.

Figure 16:
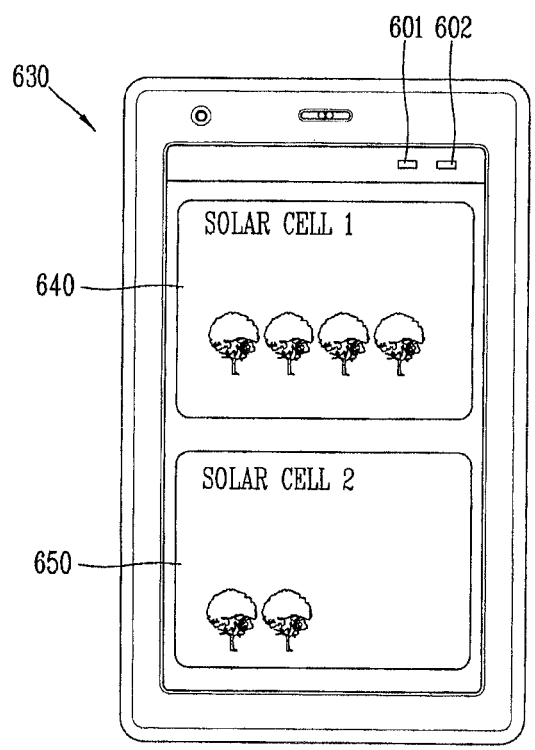
FIG. 16 is a diagram showing an example of how activation and charging state information may be simultaneously displayed for each of two solar cells in a portable terminal.

FIG. 16 shows an example of how charging state and activation state information may be displayed for each of the solar cells in the aforementioned embodiments. A first indicator 601 may be provided to indicate that a first one of the solar cells is active for charging the battery and a second indicator 602 may be provided to indicate that a second one of the solar cells is active for charging the batter.

The portable terminal also includes a display 630 which provides a first area 640 for indicating charging information of the first solar cell (e.g., how much charge has come from the first solar cell such as illustratively shown in FIGS. 5A and 5B) and a second area 650 for providing similar charging information for the second solar cell.

In accordance with any of the embodiments described herein, if the second solar cell is not in use or activated (e.g., is not receiving light or at least a predetermined amount of light) and a cover containing the second solar cell when attached blocks use of a camera, the cover containing the second solar cell may be removed to allow for use of the camera and/or other accessories in the portable terminal that were being blocked by the cover.

In accordance with one or more of the embodiments described herein, it is possible to detect whether or not a solar cell is mounted on a terminal body by applying a detect terminal separately from a power supply terminal. This provides more accurate control as well as allowing the user to recognize whether or not the portable terminal is charged by using the solar cell in controlling battery charge or the like.

Furthermore, the embodiments described herein provide a portable terminal capable of charging a battery using a solar cell while at the same time allowing content of the display unit to be viewed by a user.

In addition, the embodiments described herein provide a portable terminal capable of selectively switching power supply lines between a plurality of solar cells and a battery, thereby preventing charging current from being leaked.

According to one embodiment, a detachable coupling structure is provided between a portable terminal and solar cell, and more accurate control is capable of being realized while at the same time allowing the user to recognize whether or not the solar cell is being used to charge the terminal battery.

In accordance with one embodiment, a portable terminal includes a terminal body having a display unit, a cover detachably mounted on a surface of the terminal body, a first solar cell mounted on a surface of the cover and operated when the cover is mounted on the terminal body to generate electrical energy, a detect terminal mounted on the terminal body and brought into contact with a terminal of the cover to detect the mounting of the cover, and a controller connected to the detect terminal to detect the mounting of the cover thereby allowing the display unit to display the operating state of the first solar cell.

The cover may be implemented by a battery cover for covering a battery mounted on the terminal body. A pair of power supply terminals may be provided at a side of the detect terminal to supply power to the battery. The terminal of the cover may be connected to a ground formed on the cover to connect the detect terminal with the ground.

The display unit may display an indicator displaying a remaining charge amount of the battery mounted on the terminal body, and the indicator may be displayed to have different forms based on whether or not the cover is mounted.

The display unit may display a graphic or image visually indicating a charged amount charged by the first solar cell for a predetermined period of time.

An input/output unit covered by the cover when the cover is mounted on the terminal body may be mounted on the terminal body, and the controller may restrict the operation to the input/output unit in a state that the cover is mounted on the terminal body. Here, the display unit may display a notification screen for notifying a restriction to the operation of the input/output unit.

The cover may be mounted on the terminal body to be relatively rotated. Here, the cover may be moved between a first state in which a side of the terminal body is covered and a second state in which it is rotated by a predetermined angle from the first state and the display unit and the solar cell are oriented in the same direction.

A second solar cell connected to a battery mounted on the terminal body may be additionally provided at a different location from the first solar cell. In this case, the portable terminal may further include a switching units opening or closing power supply lines connected to the first and the second solar cells and the battery, and a comparator connected to the first and the second solar cells respectively to compare voltages generated from the first and the second solar cells with a reference voltage, and the controller may control the switching units based on the comparison result of the comparator.

Herein, the term "module" or "unit" used herein is merely intended for easy description of the specification, and the suffix itself does not give any specific meaning or function. Therefore, it should be noted that the suffix "module" or "unit" may be interchangeably used each other.

The portable terminal may be implemented in various forms. For example, a portable terminal described herein may be implemented in various forms such as a portable terminal, smart phone, laptop computer, digital broadcast terminal, personal digital assistant (PDA), portable multimedia player (PMP), or a navigation system.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A portable terminal, comprising: a body; a cover movably coupled to the body; a first solar cell on the body; and a second solar cell on the cover, wherein the first and second solar cells are oriented in a same direction to receive light when the cover is opened relative to the body, the first and second solar cells to output voltages for simultaneously charging a battery when the cover is opened and when each of the voltages from the first and second solar cells exceed a predetermined reference voltage;
   a detector to detect when the cover is attached to the terminal body; and
   a control circuit to establish a signal path between the first solar cell and battery based on a signal from the detector indicating that the cover is attached to the terminal body.

2. The portable terminal of claim 1, wherein the cover is rotatably coupled to the body.

3. The portable terminal of claim 1, wherein the cover is slidably coupled to the body.

4. The portable terminal of claim 1, the control circuit interrupts the signal path between the first solar cell or the second solar cell when the voltage output from the first solar cell or the second solar cell falls below the predetermined reference voltage.

5. The portable terminal of 1, further comprising:
a display unit to display a first indicator for the first solar cell and second indicator for the second solar cell, wherein the first indicator provides an indication of whether the first solar cell is charging the battery and the second indicator provides an indication of whether the second solar cell is charging the battery.

6. The portable terminal of claim 5, wherein the display unit displays information indicating an amount of charge supplied from the first solar cell to the battery over a predetermined period of time, and information indicating an amount of charge supplied from the second solar cell to the battery over the same predetermined period of time.

7. A portable terminal, comprising:
a cover,
a terminal body; and
a first solar cell on the cover; wherein the first solar cell generates electrical energy to charge a battery of the portable terminal when the cover is attached to the terminal body;
a detector to detect when the cover is attached to the terminal body; and a control circuit to establish a signal path between the first solar cell and battery based on a signal from the detector indicating that the cover is attached to the terminal body.

8. The portable terminal of claim 7, wherein the detector includes: a first terminal on the cover; and a second terminal on the terminal body wherein the cover is detected to be attached to the terminal body; when the first terminal is electrically coupled to the second terminal.

9. The portable terminal of claim 7, further comprising:
a first pair of supply terminals on the cover; and
a second pair of supply terminals on the terminal body,
wherein the first pair of supply terminals are adapted to be electrically coupled to the second pair of supply terminals to deliver electrically energy from the first solar cell to the battery.

10. The portable terminal of claim 7, further comprising:
a display unit
wherein the display unit displays a graphic or image visually indicating an amount of charge that that has been supplied to the battery over a predetermined period of time.

11. The portable terminal of claim 10, wherein the predetermined period of time begins from a time when the portable terminal is turned on.

12. The portable terminal of claim 7, further comprising:
a display unit,
wherein the display unit outputs information indicating an operating state of the first solar cell when the cover is attached to the terminal body.

13. The portable terminal of claim 7, further comprising:
a display unit,
wherein the display unit displays an indicator which changes appearance based on whether the cover is mounted to the terminal body and wherein the indicator also indicates an amount of remaining charge of the battery.

14. The portable terminal of claim 7, further comprising: a second solar cell mounted at a different location on the portable terminal, wherein the control circuit establishes an electrical path between the second solar cell and the battery to charge the battery.

15. The portable terminal of claim 14, further comprising:
a comparator to compare an output voltage of the first solar cell to a predetermined reference voltage and to compare an output voltage of the second solar cell to the predetermined reference voltage, and to block a signal path between the first solar cell and the battery when the output voltage of the first solar cell is below the predetermined reference voltage and when the output voltage of the second solar cell is above the predetermined reference voltage.

16. The portable terminal of claim 14, further comprising:
a display unit,
wherein a location of the display unit and a location of at least one of the first solar cell or the second solar cell receive light point in a same direction that allows a user to view the display unit.

17. A portable terminal, comprising: a body; a first cover to cover a battery in the body; a second cover movably coupled to the body, and a solar cell on the second cover to output voltage for charging a battery, wherein the second cover moves to a first position to cover the first cover and moves to a second position different from the first position, and wherein a display unit in the body is oriented in substantially a same direction as the solar cell when the second cover is in the second position to allow for simultaneous viewing of the display unit and charging of the battery;
a detector to detect when the second cover is coupled to the terminal body;
and a control circuit to establish a signal path between the first solar cell and battery based on a signal from the detector indicating that the cover is attached to the terminal body.

18. The portable terminal of claim 17, wherein the second cover slides relative to the body.

19. The portable terminal of claim 17, wherein the second cover rotates relative to the body.

* * * * *